United States Patent
Sharp

(10) Patent No.: US 11,042,347 B2
(45) Date of Patent: Jun. 22, 2021

(54) RESTORING A DISABLED DISPLAY DEVICE SPEAKER

(71) Applicant: Roku, Inc., San Jose, CA (US)

(72) Inventor: David Sharp, San Jose, CA (US)

(73) Assignee: Roku, Inc., San Jose, CA (US)

( * ) Notice: Subject to any disclaimer, the term of this patent is extended or adjusted under 35 U.S.C. 154(b) by 857 days.

(21) Appl. No.: 14/755,833

(22) Filed: Jun. 30, 2015

(65) Prior Publication Data

US 2016/0179459 A1 Jun. 23, 2016

Related U.S. Application Data

(60) Provisional application No. 62/096,530, filed on Dec. 23, 2014.

(51) Int. Cl.
*G06F 3/16* (2006.01)
*H04R 5/04* (2006.01)
*H04R 3/12* (2006.01)

(52) U.S. Cl.
CPC ............. *G06F 3/165* (2013.01); *H04R 5/04* (2013.01); *H04R 3/12* (2013.01); *H04R 2420/03* (2013.01); *H04R 2420/05* (2013.01); *H04R 2499/15* (2013.01)

(58) Field of Classification Search
CPC .. G06F 3/165; H04R 5/04; H04R 3/12; H04R 2420/03; H04R 2420/05; H04R 2499/15
See application file for complete search history.

(56) References Cited

U.S. PATENT DOCUMENTS

| | | | |
|---|---|---|---|
| 2006/0238656 A1* | 10/2006 | Chen | H04N 5/50 348/731 |
| 2009/0007169 A1* | 1/2009 | Headley | H04N 21/44222 725/14 |
| 2009/0154900 A1* | 6/2009 | Hung | G11B 19/02 386/353 |
| 2013/0128119 A1* | 5/2013 | Madathodiyil | H04N 21/4852 348/563 |
| 2014/0156854 A1* | 6/2014 | Gaetano, Jr. | H04L 65/1069 709/227 |
| 2014/0173447 A1* | 6/2014 | Das | G06F 3/04842 715/738 |
| 2014/0363024 A1* | 12/2014 | Apodaca | H03G 3/02 381/109 |
| 2016/0133154 A1* | 5/2016 | Cortes | G09B 5/065 434/157 |
| 2017/0003931 A1* | 1/2017 | Dvortsov | G11B 27/11 |

* cited by examiner

*Primary Examiner* — Beau D Spratt
(74) *Attorney, Agent, or Firm* — Sterne, Kessler, Goldstein & Fox P.L.L.C.

(57) ABSTRACT

A display device has a processor and a memory connected to the processor. The memory stores instructions executed by the processor to make a first determination that an internal display device speaker is disabled. A second determination that an external sound system is unavailable is established. A prompt is provided in response to the first determination and the second determination. The prompt includes an option to enable the internal display device speaker.

18 Claims, 4 Drawing Sheets

US 11,042,347 B2

RESTORING A DISABLED DISPLAY DEVICE SPEAKER

CROSS REFERENCE TO RELATED APPLICATIONS

This application claims the benefit of U.S. Provisional Patent Application No. 62/096,530, filed on Dec. 23, 2014. The above identified patent application is incorporated herein by reference in its entirety.

BACKGROUND

Field

The present disclosure relates generally to display devices such as, but not limited to, televisions. More particularly, this disclosure relates to techniques for restoring a disabled display device speaker.

Background Art

Display devices such as televisions have internal speakers. Display devices also have ports for external sound systems, such as sound bars or audio amplifiers and accompanying speakers. When a user deploys an external sound system, the user typically disables the internal speakers. This can cause confusion when another user utilizes the display device such as the television. For example, the other user may not know how to turn on the external sound system or the external sound system may be intentionally disabled. Thus, when the user tries to adjust the volume, no sound will be heard from the disabled internal speakers or the disabled external sound system.

SUMMARY

In an embodiment, a display device has a processor and a memory connected to the processor. The memory stores instructions executed by the processor to make a first determination that an internal display device speaker is disabled. A second determination that an external sound system is unavailable is established. A prompt is provided in response to the first determination and the second determination. The prompt includes an option to enable the internal display device speaker.

In another embodiment, a tangible computer-readable device has instructions stored thereon that, when executed by at least one computing device, causes the at least one computing device to make a first determination that an internal display device speaker is disabled and establish a second determination that an external sound system is unavailable. The instructions, when executed by the at least one computing device, causes the at least one computing device to further provide a prompt in response to the first determination and the second determination, wherein the prompt includes an option to enable the internal display device speaker.

In another embodiment of the disclosure, a method is provided that includes making a first determination that an internal display device speaker is disabled and establishing a second determination that an external sound system is unavailable. The method further includes providing a prompt in response to the first determination and the second determination, wherein the prompt includes an option to enable the internal display device speaker.

Further embodiments, features, and advantages of the present invention, as well as the structure and operation of the various embodiments of the present invention, are described in detail below with reference to the accompanying drawings.

BRIEF DESCRIPTION OF THE FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

Figure 1:
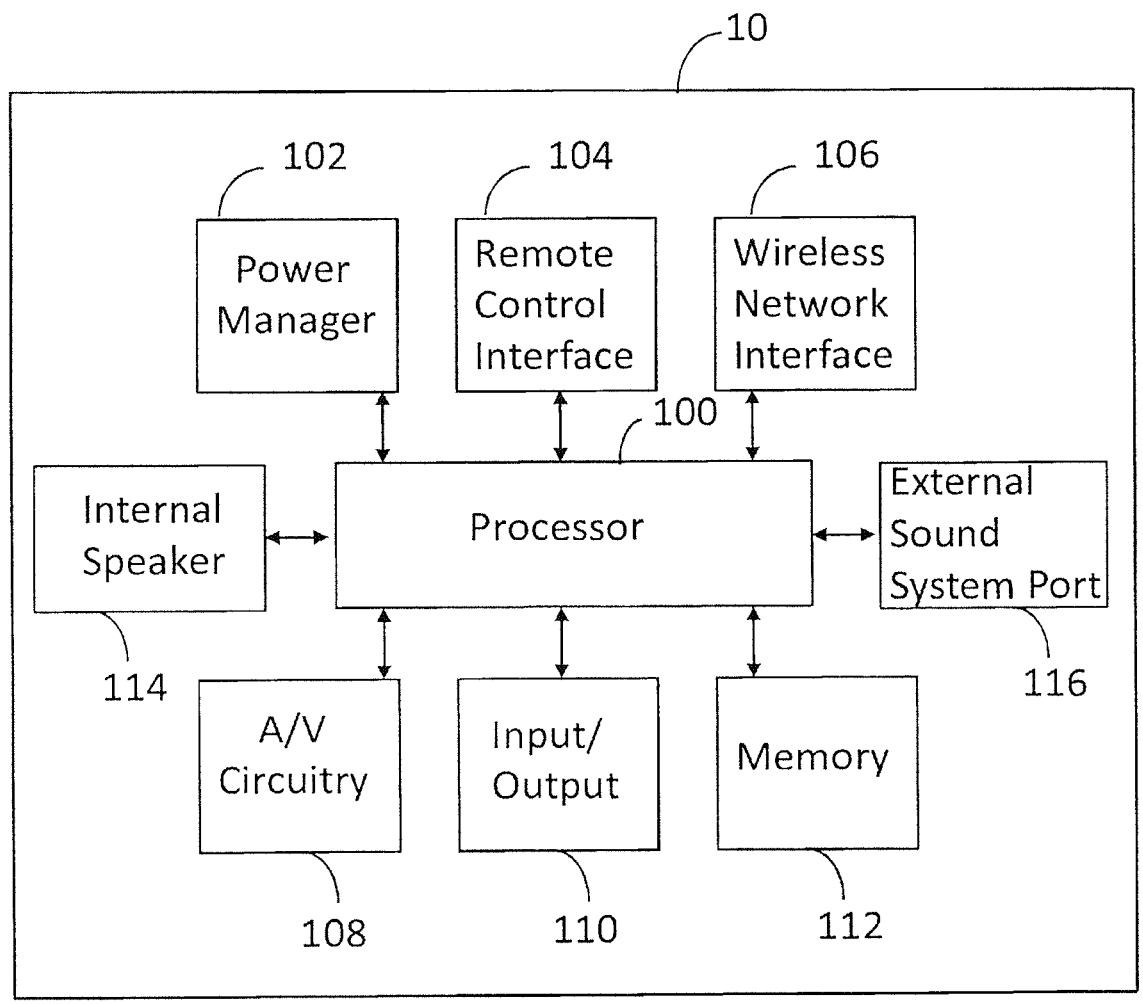
FIG. 1 illustrates display device components in accordance with an embodiment of the invention.

The present disclosure will now be described with reference to the accompanying drawings. In the drawings, generally, like reference numerals refer to corresponding parts throughout the several views of the drawings. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for a technique for restoring a disabled display device speaker.

FIG. 1 provides an example configuration of a display device 10, such as, but not limited to, a television. The display device 10 includes a processor 100, a power manager 102, a remote control interface 104 (e.g., a wireless interface to a remote control) and a wireless network interface 106 (e.g., an interface to a wireless router to stream content from the Internet). The display device 10 also includes audio/visual circuitry 108 (e.g., signal processing circuits for audio and visual content). Input/output 110 includes a display and input ports to receive signals and output ports to route signals. Memory 112 stores instructions executed by the processor 100 to implement the processing discussed in connection with FIG. 2.

FIG. 1 also illustrates an internal speaker 114 and external sound system ports 116. As previously indicated, the internal speaker 114 is typically disabled by one user when an external sound system is connected via the external sound system ports 116.

In an embodiment, power manager 102 can be configured to control the power to different elements of display device 10 based on different criteria, such as power consumption of different elements, temperature, activities of different elements, etc.

The processor 100 may utilize a central processing unit (CPU). In another embodiment, the processor 100 also utilizes a graphics processing unit (GPU), which may be integrated with the CPU or be configured to be physically separate. In an embodiment, the internal memory 112 includes one of or a combination of random access memory (RAM), flash memory and read only memory (ROM). Additional memory and memory interfaces may be provided in various embodiments to support memories such as external storage, which may include hard disks, Universal Serial Bus (USB) drives, Secure Digital (SD) cards, and the like. These memories may also be used for storage of applications, programs, buffered media, media, executable computer code, and software keys.

The remote control interface 104 enables an input device (e.g., a smartphone application or remote control) to apply commands to the display device 10. In an embodiment, the remote control interface 104 is configured to communicate with the input device through a wireless interface such as Bluetooth (BT), radio frequency (RF) and infrared (IR). In an embodiment, the remote control interface 104 supports the functionality through an input device including any combination of virtual buttons embodied on a customization screen, physical buttons, accelerometer, gyroscope, pressure sensor, tilt sensor, magnetic sensor, microphone and light sensor.

In an embodiment, the input/output interface 110 supports multiple video output options such as High-Definition Multimedia Interface (HDMI), Red-Green-Blue (RGB) component video, Separate Video (S-video), Digital Visual Interface (DVI), Video Graphics Array (VGA), Mobile High-Definition Link (MHL) and composite video. In an embodiment, USB and Apple® Thunderbolt® ports are included.

In an embodiment, wireless network interface 106 supports multiple network interfaces such as Ethernet®, Wi-Fi®, and Bluetooth®. In another embodiment, the wireless network interface 106 also supports coaxial, digital TV antenna and satellite television.

Figure 2:
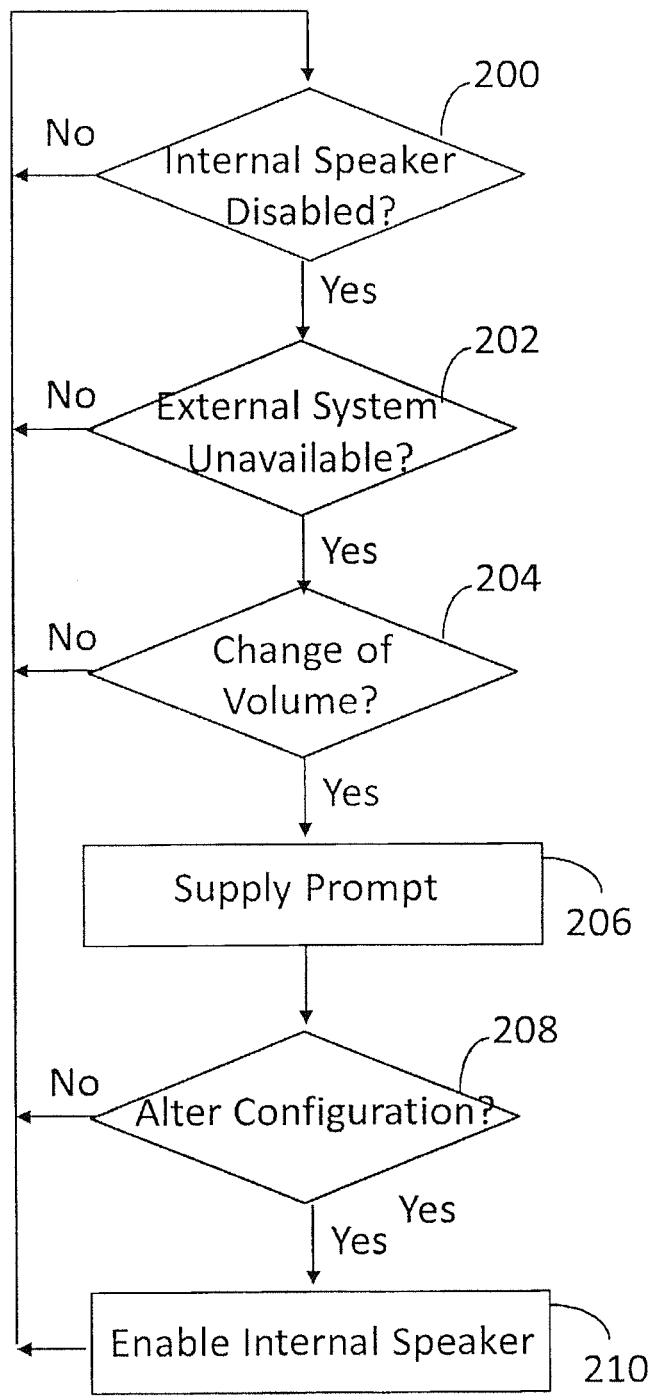
FIG. 2 illustrates processing operations associated with an embodiment of the invention.

FIG. 2 illustrates processing operations performed by the display device 10. The operations of FIG. 2 may be performed when the user attempts to control the display device 10. For example, the operations of FIG. 2 may be performed when the user turns on the display device 10 or tries to change the volume of display device 10.

In step 200, the processor 100 under the control of instructions stored in memory 112 determines whether the internal speaker is disabled. For example, the memory 112 may store a field that specifies whether the internal speaker is disabled and processor 100 is configured to check this field to determine whether the internal speaker is disabled. If so (step 200—Yes), in step 202 it is determined whether the external sound system is unavailable 202, for example, because it is not turned on, powered down, not connected, etc. The processor 100 has access to external sound system ports 116 and therefore can determine their state. If the external sound system is available (step 202—No), then the external sound system will be controlled by processor 100 to play the audio corresponding to the video displayed on display device 10. If the external sound system is not available (step 202—Yes), then there is a problem since the internal speaker is also disabled. In step 204, the processor 100 causes the display device 10 to produce an alert or wait for a user to try to change the volume. If there is a desire by the user to change the volume (step 204—Yes), then in step 206 a prompt is supplied.

Figure 3:
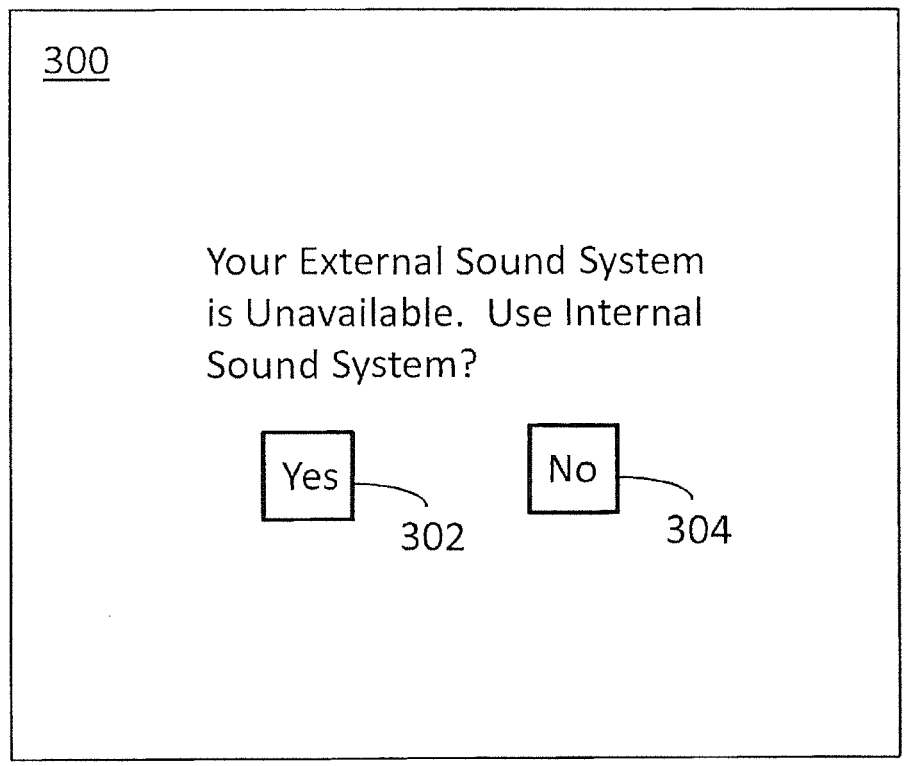
FIG. 3 illustrates a user interface that may be used in accordance with an embodiment of the invention.

FIG. 3 illustrates a sample prompt 300 that may be used in step 206. The sample interface 300 may be displayed on the display of the display device 10. Alternately, the sample interface 300 may be displayed on a remote control associated with the display device 10. For example, the remote control may have a separate digital display. Alternately, the remote control may be a mobile telephone running an application that controls the display device. In this case, the mobile telephone would display interface 300 on its touch display. The interface advises the user that the external sound system is unavailable and invites the user to use the internal sound system. The user can select a yes option 302 or a no option 304.

Returning to FIG. 2, in step 208 the processor 100 waits for a command from the user in response to the prompt provided in step 206. This user command represents user instructions to either alter or not alter the audio configuration of the system. If the no option 304 is selected (step 208—No) control returns to block 200. If the yes option 302 is selected (step 208—Yes), then the internal speaker is enabled 210. That is, the processor 100 enables internal speaker 114 such that the audio corresponding to what is being displayed on display device 10 will be carried by the internal speaker 114.

The prompt to the user and the option to restore the internal speaker of the display device provide a solution to what may otherwise be a frustrating user experience of trying to change display device volume and receiving no sound from the display device 10.

In an embodiment, the prompt of FIG. 3 may give the user the option to either enable the internal sound system, the external sound system or both. The prompt may also provide the option of enabling closed captioning. The user command (s) are provided to processor 100 and implemented in step 210.

In another embodiment, the functionality of FIG. 2 is performed by a component external to the display device 10. This external component may connect, communicate and interact with display device 10 either wirelessly or through a wired connection. For example, the external component may be a cable box or media server device connected to the display device 10. Alternatively, the external component may be a remote control (either a dedicated remote control or a cell phone, for example) associated with the display device 10.

Figure 4:
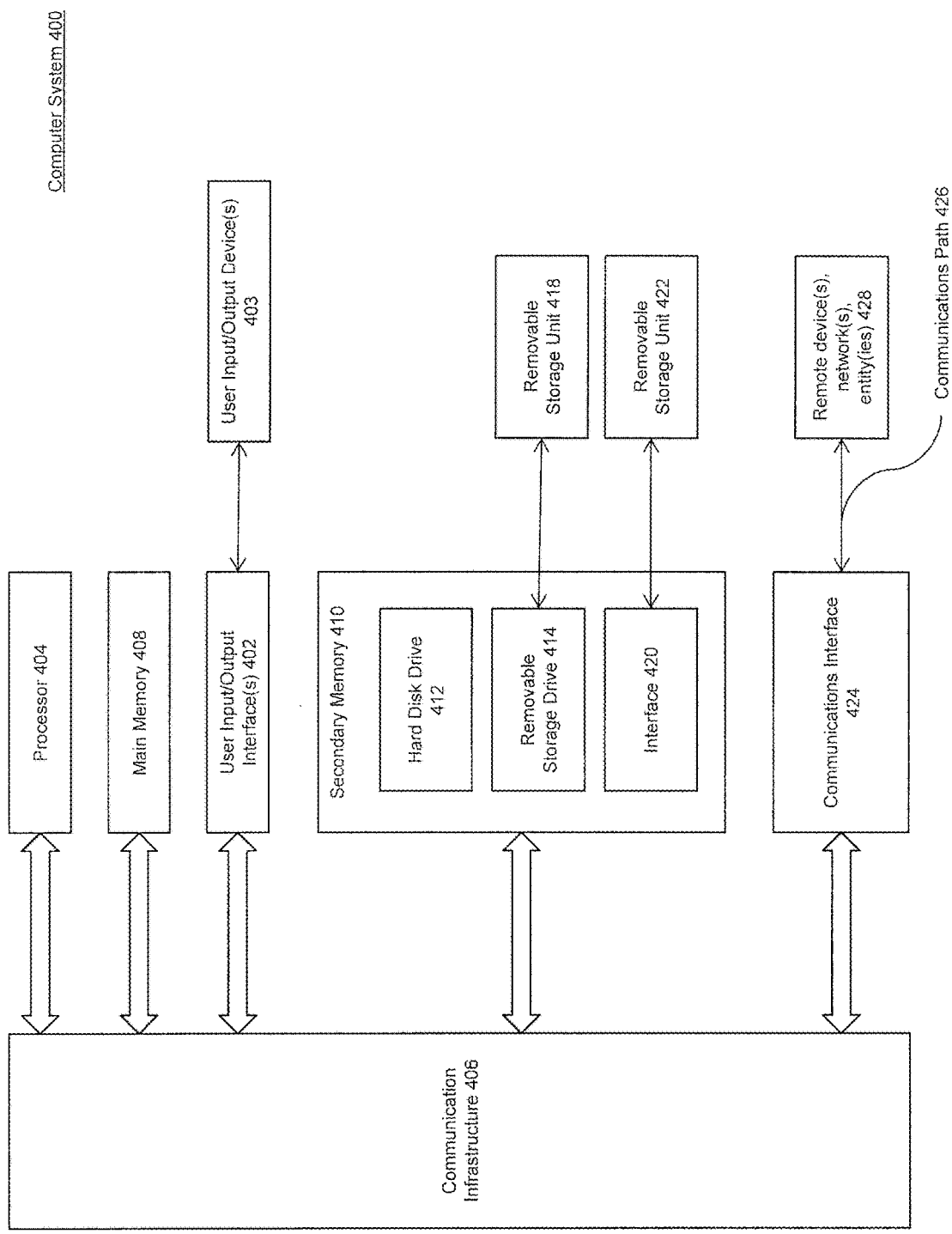
FIG. 4 illustrates an example computer system useful for implementing various embodiments.

Various embodiments can be implemented, for example, using one or more well-known computer systems, such as computer system 400 shown in FIG. 4. Computer system 400 can be any well-known computer capable of performing the functions described herein. Computer system 400 may be internal or external to display device 10 as discussed above.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

Based on the teachings contained in this disclosure, it will be apparent to persons skilled in the relevant art(s) how to make and use embodiments of the disclosure using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A display device, comprising:
a processor; and
a memory connected to the processor, the memory storing instructions, that when executed by the processor, cause the processor to:
when displaying content; determine whether an internal speaker of the display device for playing audio associated with the content is disabled;
in response to a determination that the internal speaker of the display device is disabled, determine whether an external sound system associated with the display device is unavailable;

receive a command to change volume of the display device; and in response to a determination that the external sound system associated with the display device is unavailable and to receiving the command to change the volume, provide a prompt, wherein the prompt includes an option to enable the internal speaker of the display device or the external sound system associated with the display device.

2. The display device of claim 1, wherein the instructions, when executed by the processor, cause the processor to enable the internal speaker of the display device in response to a selection of the option to enable the internal speaker of the display device.

3. The display device of claim 1, wherein the instructions, when executed by the processor, cause the processor to provide the prompt on a display of the display device.

4. The display device of claim 1, wherein the instructions, when executed by the processor, cause the processor to provide the prompt to a display of a remote control associated with the display device.

5. The display device of claim 4, wherein the remote control is a mobile telephone running an application that controls the display device.

6. The display device of claim 1, wherein the memory stores a field that specifies whether the internal speaker of the display device is disabled.

7. The display device of claim 1, further comprising an external sound system port and wherein the instructions, when executed by the processor, cause the processor to determine a state of the external sound system associated with the display device via the external sound system port.

8. A non-transitory computer-readable storage medium storing instructions that, when executed by at least one computing device, cause the at least one computing device to perform operations comprising:

when displaying content, determining whether an internal speaker of a display device for playing audio associated with the content is disabled;

in response to a determination that the internal speaker of the display device is disabled, determining whether an external sound system associated with the display device is unavailable;

receiving a command to change volume of the display device; and in response to a determination that the external sound system associated with the display device is unavailable and to receiving the command to change the volume, providing a prompt, wherein the prompt includes an option to enable the internal speaker of the display device or the external sound system associated with the display device.

9. The non-transitory computer-readable storage medium of claim 8, the operations further comprising:

enabling the internal speaker of the display device in response to a selection of the option to enable the internal speaker of the display device.

10. The non-transitory computer-readable storage medium of claim 8, wherein the providing the prompt comprises providing the prompt on a display of the display device.

11. The non-transitory computer-readable storage medium of claim 8, wherein the providing the prompt comprises providing the prompt on a display of a remote control associated with the display device.

12. The non-transitory computer-readable storage medium of claim 11, wherein the remote control is a mobile telephone running an application that controls the display device.

13. A method comprising:

when displaying content, determining whether an internal speaker of a display device for playing audio associated with the content is disabled;

in response to a determination that the internal speaker of the display device is disabled, determining whether an external sound system associated with the display device is unavailable;

receiving a command to change volume of the display device; and in response to a determination that the external sound system associated with display device is unavailable and to receiving the command to change the volume, providing a prompt, wherein the prompt includes an option to enable the internal speaker of the display device or the external sound system associated with the display device.

14. The method of claim 13, further comprising:

enabling the internal speaker of the display device in response to a selection of the option to enable the internal speaker of the display device.

15. The method of claim 13, wherein the providing the prompt comprises providing the prompt on a display of the display device.

16. The method of claim 13, wherein the providing the prompt comprises providing the prompt on a display of a remote control associated with the display device.

17. The method of claim 16, wherein the remote control is a mobile telephone running an application that controls the display device.

18. The method of claim 13, wherein the prompt further comprises a second option for enabling closed captioning.

* * * * *